United States Patent [19]

Steele

[11] 4,134,466

[45] Jan. 16, 1979

[54] WEIGH JET ASSEMBLIES

[75] Inventor: James R. Steele, Stillwater, Minn.

[73] Assignee: Dynamic Air Inc., St. Paul, Minn.

[21] Appl. No.: 792,902

[22] Filed: May 2, 1977

[51] Int. Cl.² ............................................. G01G 13/10
[52] U.S. Cl. .................................. 177/114; 177/116; 302/3; 302/53
[58] Field of Search ............... 177/211, 116, 114, 106, 177/105; 302/3, 53; 141/83, 67, 68

[56] References Cited

U.S. PATENT DOCUMENTS

| | | | |
|---|---|---|---|
| 2,907,606 | 10/1959 | Caldwell | 302/53 |
| 2,938,701 | 5/1960 | Thorsson | 177/211 X |
| 3,158,405 | 11/1964 | Krenke | 302/3 |
| 3,966,000 | 6/1976 | Allen | 177/1 |

Primary Examiner—Joseph W. Hartary
Attorney, Agent, or Firm—Jacobson and Johnson

[57] ABSTRACT

A pneumatic conveyor tube weigh jet assembly comprising a pivotally suspended holding chamber, a load cell for determining the weight of material in the holding chamber and flexible connections which allow for the weigh jet assembly to be permanently connected into a pneumatic conveying system.

8 Claims, 7 Drawing Figures

000
WEIGH JET ASSEMBLIES

BACKGROUND OF THE INVENTION

1. Field of the Invention

This application relates generally to weighing mechanisms and more specifically, to in-line weighing mechanisms for use in pneumatic systems in which the material being transported is weighed or metered in a precise or predetermined manner without removing the material from the system.

2. Description of the Prior Art

One of the problems inherent with in-line weighing systems is that to accurately measure or weigh the material it is usually necessary to remove the material from the pneumatic conveying lines. If the material is weighed in the system, the weight of the pneumatic lines as well as the forces generated by the moving material must be taken into consideration to obtain an accurate measurement. The present invention allows the material to remain within the confines of the pneumatic system and still allow accurate measurement of the material.

SUMMARY OF THE INVENTION

Briefly, the weigh jet assembly is comprised of a pivotally suspended holding chamber which contains non-load bearing flexible restraints to prevent undue motion of the holding chamber and a load cell that sends an appropriate signal when the amount of material has reached a predetermined level. A pneumatic operated closure valve is located in the holding chamber for sealing and pressurizing the holding chamber so that the material can be discharged from the holding chamber after weighing.

DESCRIPTION OF THE PREFERRED EMBODIMENT

Figure 1:
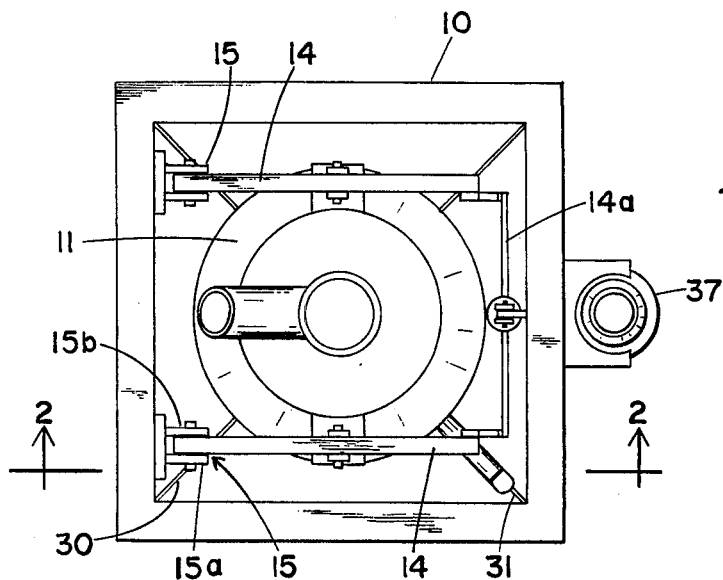
FIG. 1 is a top view of the weigh jet assembly.
Figure 3:
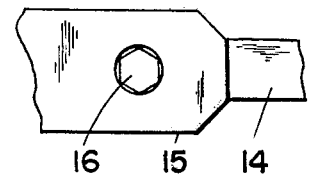
FIG. 3 is a detailed view of the pivotal members of the weigh jet assembly.
Figure 2:
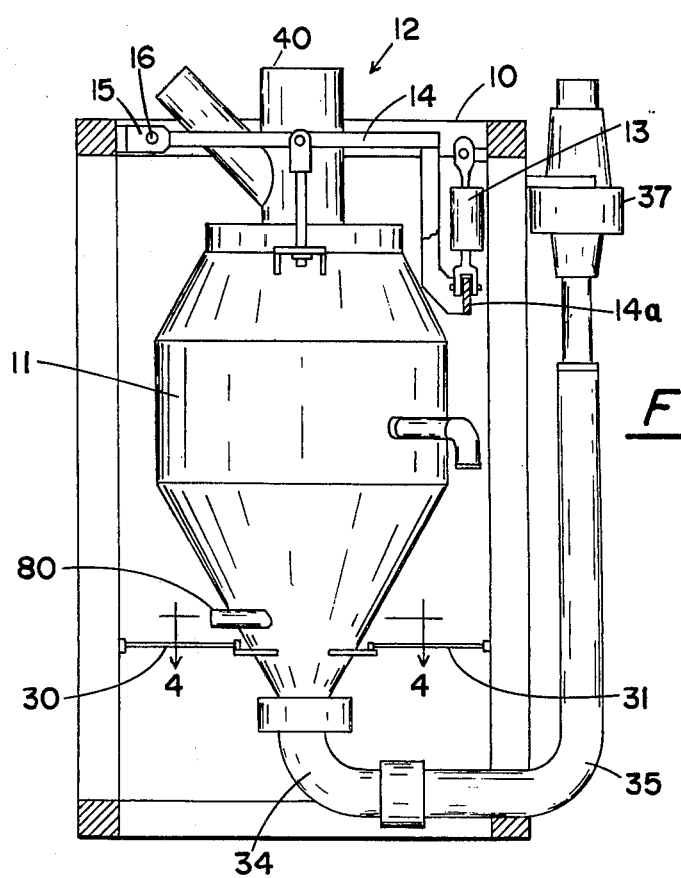
FIG. 2 is a front view of the weight jet assembly.

FIG. 1 and FIG. 2 show the preferred embodiment of a weigh jet assembly comprising a main frame 10 and a holding chamber or hopper 11 located therein. Hopper 11 is pivotally supported to frame 10 through a pair of L-shaped members 14 which are pivotally mounted to frame 10 through brackets 15 and pivot members 16. Pivot member 16 is hexagonal to produce point contact between members 14 and brackets 15. It has been found that point contact rather than surface-to-surface contact such as with a cylindrical rod has less potential to bind and consequently reduces chances of error due to frictional binding. Each of the brackets 15 contain a U-shaped opening for receiving member 14. The sides of bracket 15, which are designated by reference numerals 15a and 15b, hold members 14 in proper alignment by preventing twisting because of the sandwiching relationship of member 14 to bracket 15. Connected to each of L-shaped members 14 is a cross piece 14a which is connected to frame 10 through a load cell 13. Load cell 13 is connected to a suitable electrical monitoring unit (not shown). A typical load cell may be a strain gauge which has an electrical output proportional to the strain on the load cell. As load cells are known in the art, no further description of the operation will be included except to state the output of the load cell will be proportional to the weight of material in hopper 11.

Connected to the bottom of hopper 11 are a set of flexible restraining members 30, 30a, 31 and 31a which restrain or prevent hopper 11 from swaying within the confines of frame 10 during the filling of hopper 11. Connected to the bottom of hopper 11 is an elbow tube 34 and a flexible tube 35. Tube 35 is flexible and made from a material such as reinforced rubber or the like. The purpose of flexible tube 35 is so that no weight can be transferred to pneumatic booster valve 37 which is rigidly mounted to frame 10. Pneumatic booster valve 37 is of the type shown and described in U.S. Pat. No. 3,708,207.

Briefly, the main components of the system for weighing comprises flexible supports of hopper 11 which allow the weight of the material in hopper 11 to be measured by the strain recorded in load cell 13. That is, neither the flexible restraints 30, 30a, 31 and 31a and flexible tube 35 are capable of providing an upward or vertical restraining force which would counterbalance the gravitational forces on hopper 11.

In operation, hopper 11 is filled with material through inlet 40. The increased weight of material in hopper 11 provides a corresponding strain on load cell 13. When a predetermined amount of material is weighed out in hopper 11, the means for supplying material to the hopper is automatically closed by a signal from load cell 13.

Figure 5:
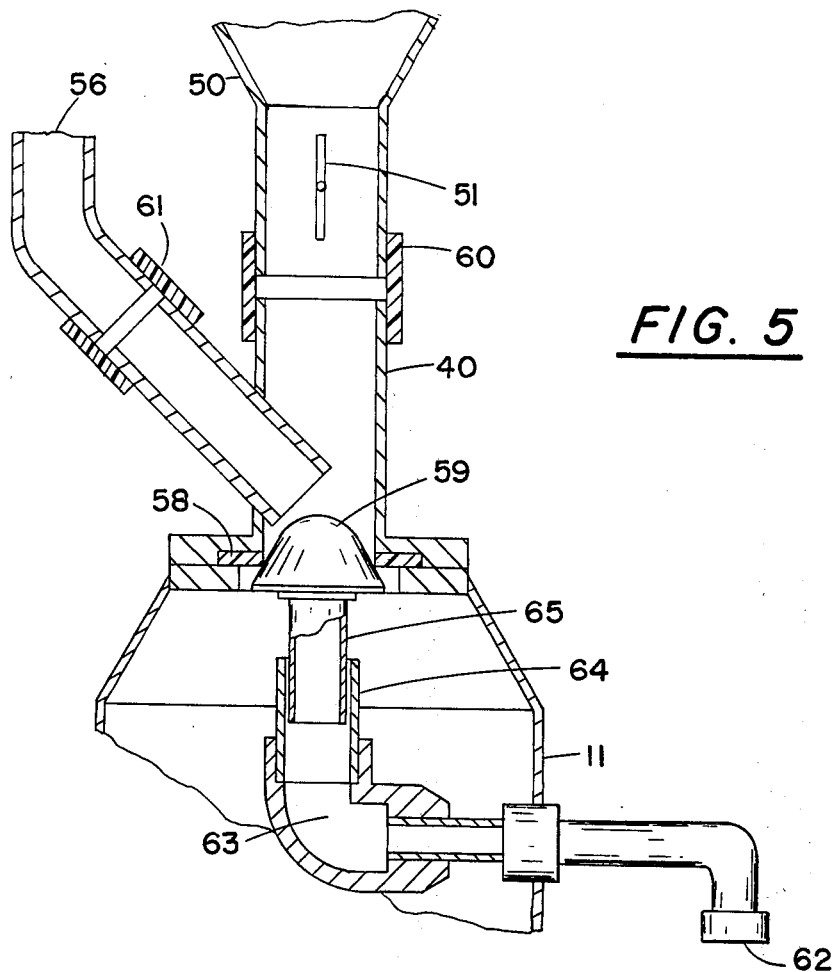
FIG. 5 is a pneumatic sealing means for the weigh jet assembly.

In order to understand the closing and sealing of the hopper, reference should be made to FIG. 5 which shows the inlet feeding mechanism designated by reference numeral 50. A butterfly valve 51 is located therein to shut off the flow of material into hopper 11. A vent member 56 is located at an angle to inlet 50 for venting air from the hopper 11 during the filling of hopper 11. A flexible connection 60 is shown connecting inlet 50 to inlet section 40 and a flexible connection 61 is used to connect vent 56 to hopper 11.

A dome or hemispherical shaped rubber member 59 is shown seated against an annular seat 58 which is located in the entrance of the hopper 11.

Figure 4:
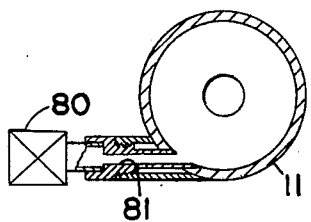
FIG. 4 is a cutaway view of pressure re-entry valve.

When the load cell indicates that the hopper contains the desired amount of material, a signal is sent to rotating butterfly valve 51 from the vertical position (open position) to the horizontal position (closed position). The butterfly valve stops flow of any further material into hopper 11. At the same time a pneumatic signal is sent to the air inlet passage 62 which supplies air to chamber 63. Chamber 63 has a cylindrical sleeve 64 which contains a loose fitting cylindrical piston 65 located therein. The purpose of having loose fitting cylindrical sleeves 65 and 64 is to allow air to escape between the surfaces of the two cylindrical members and thus pressurize hopper 11. At the same time the air pressure forces hemispherical member 59 against annular sealing member 58 to effectively seal off hopper 11 from the inlet 50. The air escaping between cylindrical sleeves 64 and 65 increases pressure within hopper 11 to a conveying level so that the material in hopper 11 can be pneumatically discharged from hopper 11. As the pressure within hopper 11 is increased, the pneumatic conveying system booster valve 37 is also brought into operation. The pressure in hopper 11 and the booster valve 37 coact to force the material in hopper 11 back into the pneumatic conveying system through flexible tube 35 and booster valve 37. A secondary tangential pneumatic port is located at the bottom of hopper 11 to assist in discharging material from hopper 11. Port 80 is shown in section in FIG. 4 which is taken along lines 4—4 of FIG. 2. Port 80 has an inlet section 81 which is open and tangential to hopper 11. The purpose of port 80 is to dislodge any materials from the walls of hopper 11. The use of a tangential port provides excellent dislodging due to vortical action as well as minimizing the abrasion on hopper 11 due to moving particles of material.

Figure 6:
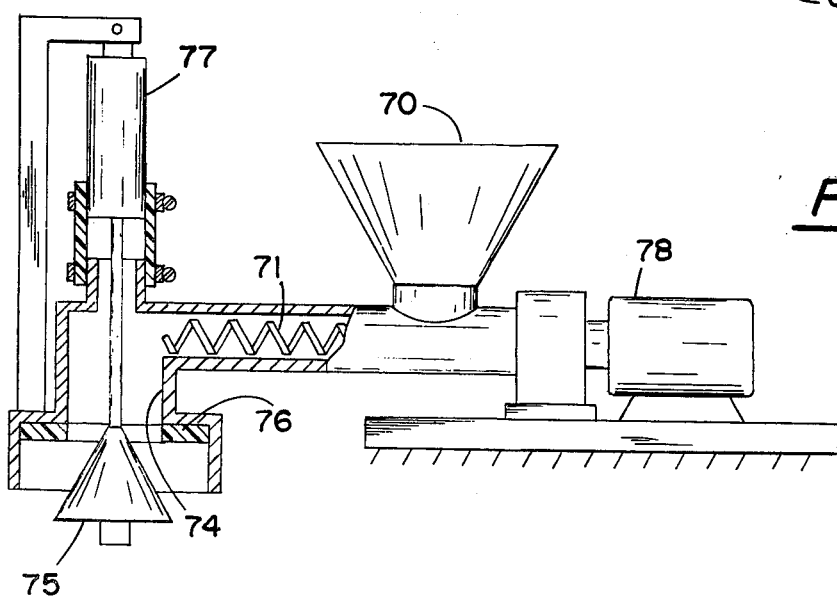
FIG. 6 is a screw feeder and shut off for use with the weigh jet assembly.

Reference to FIG. 6 shows an alternate type of supply and shut off mechanism in which material is fed into the hopper 70 by a screw extractor 71 that rotatably forces material into a gravity feed chamber 74 that contains an inverted rubber cone 75 and an annular sealing member 76. When the load cell sends a signal that the amount of material within hopper 11 is at the proper level, the power to the motor is shut off and a pneumatic signal is sent to cylinder 77 which causes upward displacement of cone 75 against sealing member 76 thereby preventing flow of any further material into hopper 11.

Figure 7:
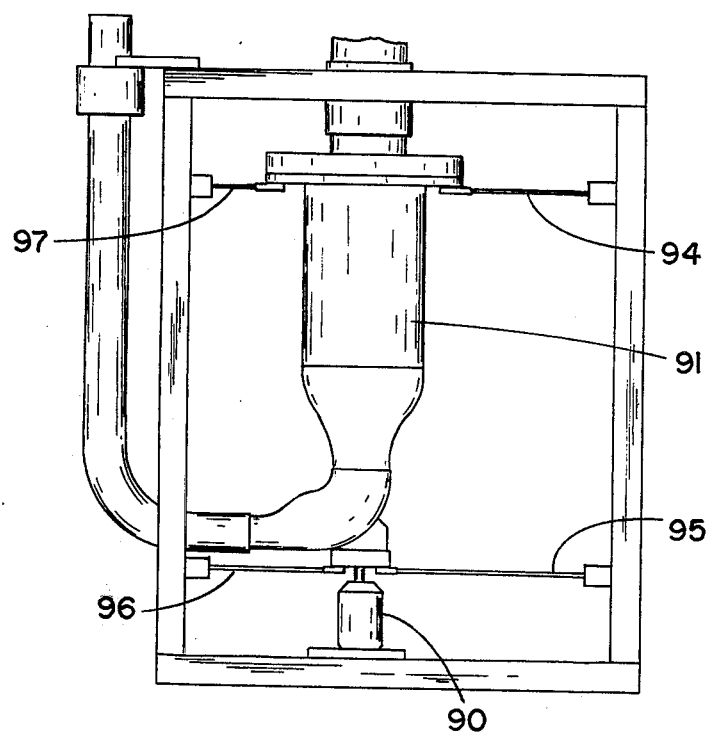
FIG. 7 is an alternate embodiment of a weigh jet assembly.

Referring to FIG. 7, an alternate embodiment of a weigh jet assembly is shown in which a load cell 90 is located below the weigh jet assembly 91. In this embodiment load cell 91 supports the weight jet assembly from below rather than from above as shown in FIG. 1. In this embodiment, flexible restraining members 94, 95, 96, 97, and other flexible restraining members (not shown) restrain the horizontal movement of hopper 91 without restraining the vertical displacement of hopper 11 due to weight of material in hopper 11. Typically, the flexible restraints may be such material as cable or chain. As the feed valves, sealing valves and booster valves are the same for this unit as the unit described hereinbefore, they will not be described in further detail. Typically, either of my units may be used to weigh material as light as 200 grams and in excess of a kilogram.

I claim:

1. A weigh jet assembly for weighing a predetermined amount of material within the confines of a conveying system:
    a main support frame;
    a hopper mounted to said support frame, said hopper having means for responding to the amount of material located in said hopper;
    an inlet in said hopper, said inlet including means for isolating the hopper from the supply source when the means for responding to the amount of material reaches a predetermined level, said means for isolating the hopper from the supply source includes a pressure activatable piston having a head for forming sealing engagement with the hopper, said pressure activatable piston loosely mounted within the confines of a cylindrical sleeve to thereby allow air to pass between the sleeve and the piston to thereby pressurize said hopper; and
    further means connected to said hopper for discharging material from said hopper.

2. The invention of claim 1 wherein said hopper is pivotally supported in said frame.

3. The invention of claim 2 wherein said hopper is restrained from lateral motion by flexible restraints.

4. The invention of claim 1 wherein said further means connected to said hopper includes a flexible discharge tube.

5. The invention of claim 4 wherein said hopper includes a tangential positioned port for dislodging material from the hopper.

6. The invention of claim 1 wherein said hopper is restrained from lateral motion in at least one direction by support brackets mounted to said frame.

7. The invention of claim 6 wherein said hopper is pivotally supported in said main frame.

8. The invention of claim 7 including a strain gauge load cell for monitoring the weight of material in the hopper and a booster valve for assisting in discharging the material from said hopper.

* * * * *